May 9, 1950     R. L. BOYER     2,506,566

INTERNAL-COMBUSTION ENGINE

Filed April 25, 1945

INVENTOR.
RALPH L. BOYER.
BY Ward Crosby & Neal
ATTORNEYS.

Patented May 9, 1950

2,506,566

UNITED STATES PATENT OFFICE 2,506,566

INTERNAL-COMBUSTION ENGINE

Ralph L. Boyer, Mount Vernon, Ohio, assignor to Cooper-Bessemer Corporation, Mount Vernon, Ohio, a corporation of Ohio Application April 25, 1945, Serial No. 590,268

2 Claims. (Cl. 123—1)

The supercharging of oil fueled Diesel engines and gasoline engines has become common practice but this has not been true in respect to four cycle engines powered by gaseous fuels such as natural gas, coke-oven gas or other by-product gases, probably because of difficulties met with in overcoming other objections if supercharging by usual methods be attempted in engines of the last mentioned type. The invention aims to provide a four cycle supercharged engine primarily powered by gaseous fuel as above described, wherein the gas and air will be effectively mixed and compressed in the cylinders without entailing the objections of usual supercharging methods when applied to gaseous fuels, and wherein the efficiency and accuracy of timing of the ignition will be substantially improved by proper regulation of the air and gas, and by the ignition thereof through the injection near the end of the compression stroke of a small amount of liquid fuel having a lower spontaneous ignition point than the gas-air mixture, the pressure and temperature in the cylinder being held somewhat under the point where the mixture will ignite spontaneously of itself, and the injected oil producing a flame type of ignition which enables the engine to achieve the efficiency of the Diesel cycle, without requiring the use of a high pressure compressor. Due to this increased efficiency only a relatively low amount of gas is needed, with the result that the gas-air ratio in the cylinder is so low that spontaneous ignition of the mixture under high compression is more readily avoided, i. e. the engine is not prone to pre-ignition, and accurate timing of the ignition may be secured by the oil injection, which is difficult to secure with electric ignition in an engine of this character. The engine operates with markedly increased efficiency and reliability, only a very minute amount of oil being required, merely enough to produce a pilot flame. Further objects and advantages of the invention will be in part obvious and in part specifically referred to in the description hereinafter contained which, taken in conjunction with the accompanying drawings, discloses a preferred form of supercharging apparatus operating in accordance with the invention. It should be understood, however, that the disclosure is only illustrative of the principles of the invention in its broader aspects. In the drawings—

Figure 1:
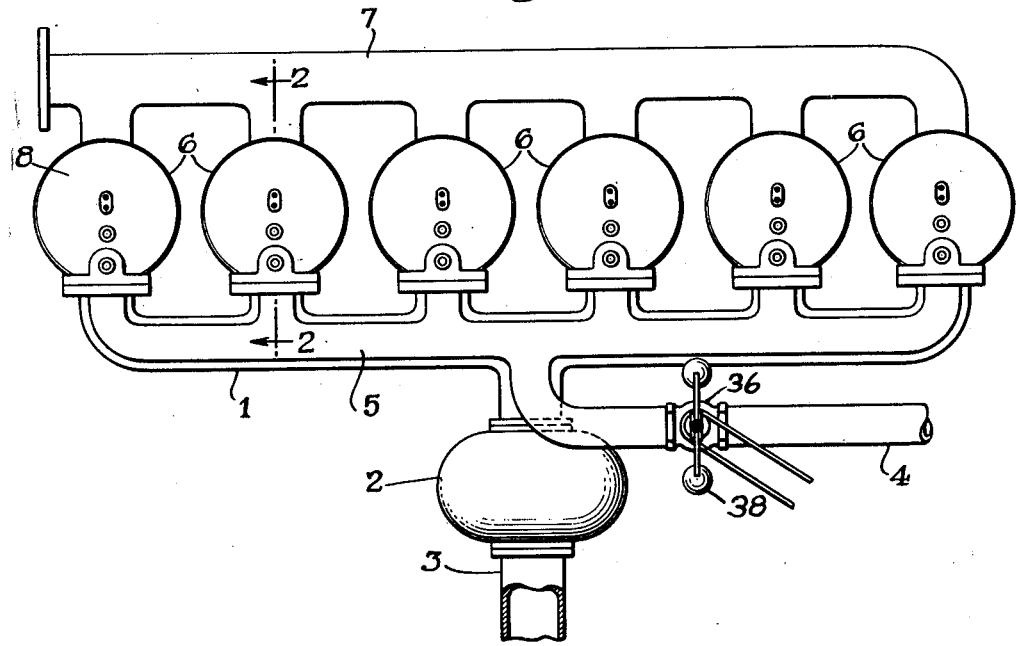
Fig. 1 is a plan view of a multi-cylinder engine constructed to operate in accordance with the invention, and showing certain auxiliary features of control of the air and gas which are preferably used in conjunction therewith.
Figure 2:
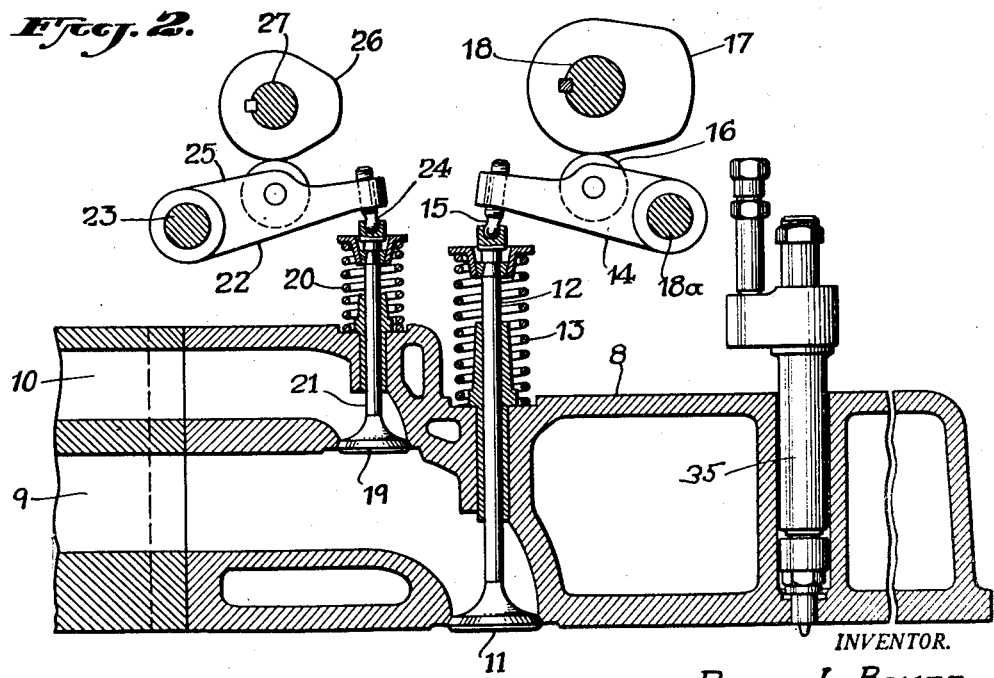
Fig. 2 is a sectional view showing a cylinder head having air and gas supplying mechanism operating in accordance with the invention, and equipped to secure ignition by oil injection as above described, the section being taken on line 2—2 of Fig. 1.

In carrying out the present invention as shown in Figs. 1 and 2 an intake manifold 1 may be used to which air under pressure is supplied by a blower or turbo-blower indicated diagrammatically at 2, and drawing in air through an intake pipe 3. Gaseous fuel under pressure will also be supplied from a supply pipe 4 leading to a manifold 5. The manifolds 1 and 5 will be connected to the respective engine cylinders 6, which may also be understood as connected in usual manner to an exhaust manifold 7.

A main inlet valve controls the admission of gas and air into the engine cylinder, the gas entering into the mixture being kept separate from the air until a point slightly in advance of the inlet valve above mentioned, at which point a gas valve is interposed so that the supply of gas to mix with the air may be shut off when desired. Then the valves above mentioned are so controlled that the inlet valve opens ahead of the gas valve, thus first supplying to the engine cylinder pure air under pressure which may be used for scavenging purposes. Then the gas valve is opened so as to supply to the cylinder a combustible mixture of air and gas in suitable proportions; then the gas valve is closed while the inlet valve still remains open, thus clearing the inlet passage of combustible mixture, after which the inlet valve closes. Then when the inlet valve opens at the beginning of the next cycle there will be no residual combustible mixture in the path of travel of the air, and scavenging may be secured by the initial stream of pure air without the wastage of gaseous fuel through the exhaust valve.

The illustrated apparatus will be described as applied to one of the cylinders 6 the cylinder head 8 of which is provided with an air conducting passageway 9 (Fig. 2) connected in usual manner to the intake manifold 1, and a gaseous fuel supply passageway 10 likewise connected to the manifold 5. The supply of air to the cylinder space, and also the supply of combustible mixture as hereinafter described, is controlled by a suitable inlet valve 11 at the delivery end of the passageway 9. This valve is illustrated as that of the poppet type having a stem 12, and urged toward closed position by a spring 13, suitable mechanism being provided to hold the valve open at proper times, as typified by an oscillating arm 14 having a stud 15 which engages the valve stem, and a roller 16 which engages a valve cam 17 on a rotary shaft 18.

The gas valve 19 controls communication between the passageways 9 and 10, and as above mentioned is located only a short distance ahead of the main valve 11, so that a mixture of gas and air is present only in the delivery end of passageway 9. This valve 19 may also be of the poppet type having a stem 20, and being urged toward closed position by a spring 21. Appropriate operating mechanism will also be provided for proper timing of the valve, as typified by the oscillating arm 22 pivoted about shaft 23 and having a stud 24 to engage the valve stem, the arm 22 having a roller 25 engaging a cam 26 carried by a rotary timing shaft 27.

As above mentioned the timing is such that inlet valve 11 opens ahead of valve 19. This will admit pure air under pressure to the cylinder, and the stream of air accordingly may be used for scavenging purposes by opening valve 11 while the exhause valve (not shown) is still open. The exhaust valve is neither illustrated nor described in detail, since it may be assumed to be of any known or appropriate construction.

After scavenging is completed, the gas valve 19 will be open to admit gas into the delivery end of passageway 9 in admixture with the air, thus securing supercharging of the mixture, and after the requisite amount of fuel has been admitted valve 19 will be closed and valve 11 will still remain open long enough for the air passing through passageway 9 to clean out therefrom the residual gas remaining in the delivery end of such passageway. Thus when valve 11 is next opened as previously described, there will be no residual combustible mixture in passageways 9 or in the intake manifold.

As shown best in Fig. 2, the gas and air admitting mechanism previously described is used in conjunction with an appropriate oil injection nozzle 35, which should be understood as operated and timed in appropriate manner to inject a small amount of oil preferably less than 10% of the total heat value of the fuel, near the end of the compression stroke. During the exhaust stroke, the valve 11 will have opened (while the valve 19 is still closed) to promote complete scavenging. Then as the suction stroke begins, valve 19 will be opened to admit the requisite amount of gas which serves as the major fuel, in admixture with the air. As compared to gas fueled engines of usual types, the amount of gaseous fuel required may be reduced by 25% or more due to the increased efficiency obtained, which equals the best Diesel performance, and this smaller amount of gas in turn makes it possible to obtain a high compression pressure appropriate for operation on the Diesel cycle without risk of spontaneous pre-ignition of the mixture. Furthermore the pressure required for the gas and air supplies will be much lower (for example of the order of 5-10 lbs. per sq. in.) than in prior engines where it was attempted to spontaneously ignite a gas-air mixture by injecting gas into a high compressed charge of air, which requires a gas compressor pumping up to a pressure of about 1200 lbs. per sq. in.

The gas valve 19 is closed prior to valve 11 as above described, to clear the passage 9 of explosive mixture, and then valve 11 closes, after which the compression of the mixture is completed and oil injected to produce ignition.

In the form of the invention shown in Figs. 1 and 2 the supply of air is preferably left unthrottled so that the engine receives a full charge of air at all loads. Regulation may be secured in simple manner by controlling the amount of gaseous fuel admitted, as by a valve 36 in the gas supply pipe 4, which is controlled by a flyball governor 38 suitably driven by the engine. Alternatively the governor may control the period of opening of the gas valves 19. The amount of liquid fuel injected may be kept constant at different loads and need not attain as much as 10% of the total heat units supplied at maximum load.

This application is a continuation in part of my prior copending application Serial Number 480,132 filed March 23, 1943 entitled "Supercharger for four cycle gas fueled engines," now Patent No. 2,375,071, issued May 1, 1945.

While the invention has been disclosed as carried out by apparatus of the above described specific constructions it should be understood that many changes may be made therein without departing from the invention in its broader aspects, within the scope of the appended claims.

I claim:

1. A supercharged four cycle, primarily gas fueled engine of the class described, having passageways therein for conducting air and permanent gas fuel under relatively low pressure, valve mechanism communicating with said passageways, said valve mechanism being constructed and arranged to inject into the cylinder an air and gaseous fuel mixture which is of the order of twenty-five percent leaner in gas as compared to a chemically perfect air-gas mixture to prevent spontaneous ignition thereof when compressed to high pressure within the range hereinafter set forth, said valve mechanism also being constructed and arranged to initiate the admission of air into the cylinder before the completion of the exhaust stroke and initiate the admission of gaseous fuel at low pressure during the suction stroke, said engine being constructed to compress the air-gas fuel mixture to a high pressure which will ignite a chemically perfect air-gas mixture but under the spontaneous ignition point of the said lean mixture, and means for injecting a small amount of liquid fuel into the thus compressed mixture to ignite the latter.

2. The method of operating a four cycle, primarily gas fueled engine of the class described, which includes injecting air under relatively low pressure into the cylinder during the latter part of the exhaust stroke and continuing into the suction stroke, injecting permanent gas fuel under relatively low pressure into the cylinder during the suction stroke, regulating air and gaseous fuel thus admitted to form a mixture which is of the order of twenty-five percent leaner in gas as compared to a chemically perfect air-gas mixture to avoid spontaneous ignition thereof when compressed to high pressure within the range hereinafter set forth, compressing said mixture to a high pressure sufficient to spontaneously ignite a chemically perfect air-gas mixture but under the spontaneous ignition point of said lean mixture, and injecting a small amount of liquid fuel into the thus compressed mixture to ignite the latter.

RALPH L. BOYER.

REFERENCES CITED

The following references are of record in the file of this patent:

UNITED STATES PATENTS

| Number | Name | Date |
| --- | --- | --- |
| 673,160 | Diesel | Apr. 30, 1901 |
| 1,858,824 | Heidelberg | May 17, 1932 |
| 2,375,071 | Boyer | May 1, 1945 |